Patented July 9, 1935

2,007,411

UNITED STATES PATENT OFFICE 2,007,411

METHOD OF COLORING SHEETED ASBESTOS-CEMENT COMPOSITION MATERIAL AND THE LIKE

Karel Šticha, Hradec Kralove, Czechoslovakia

No Drawing. Application June 20, 1934, Serial No. 731,572. In Czechoslovakia June 22, 1933

3 Claims. (Cl. 92—40)

This invention relates to a new and improved method of coloring asbestos-cement sheeted composition material, and has for its object to enhance the brightness and intensity of the colors in the finished material.

Sheeted asbestos-cement composition material has hitherto been colored either by incorporating coloring matter in the composition during treatment in the Hollander or by superficially coloring the finished material on one side.

The disadvantage of the former method consists in the fact that the presence of the cement, in conjunction with the prolonged mechanical treatment in the Hollander and in the mixers proceeding for some 1½ to 2 hours uninterruptedly, results in deterioration and dulling even of the most intense and highest quality coloring matter, so that the colors of the finished product are poor and dull in effect.

The second of the two methods mentioned has the disadvantage that the superficial layer or coat of coloring matter is easily damaged by scratching and wear, and such damage is in fact unavoidable under practical working conditions. Moreover, the superficial layer of coloring matter is not capable of withstanding the action of rain and snow for long, and becomes gradually worn away when exposed to the weather until the surface becomes eventually colorless.

It is the purpose of the present invention to overcome both the above mentioned drawbacks, and this result is achieved by first coloring the composition in the known manner during treatment in the Hollander, and then applying supplementary fresh coloring matter in the form of color solutions, preferably by spraying, to one or more of the layers of the sheeted material and preferably to the uppermost layer only, while the material is travelling on the felt carrier after leaving the sheeting rolls. In this manner the cement is not given time to exert a detrimental effect upon the intensity and brightness of the added coloring matter, since the application of this supplementary coloring matter is given immediately before the material passes on to the accumulator roll.

It will be understood that the finished material thus produced is colored through and through, as in the case of the material colored according to the first mentioned of the methods hitherto known for coloring this class of material, but in addition a superficial layer of the material has been brightened and intensified in tone to a greater depth than has hitherto been achieved by known methods by the application of additional coloring matter in the manner described above. The color finish thus obtained is proof against damage by scratching and wear.

I claim:

1. The method of coloring asbestos-cement sheeted composition material which consists in coloring homogeneously a mix of asbestos cement, reducing the said mix to sheet form, and then applying aqueous color solutions to the said material while still in the wet condition and prior to making up the required thickness of sheet by lapped rolling in a known manner.

2. The method of coloring asbestos-cement sheeted composition material which consists in coloring homogeneously a mix of asbestos and cement, reducing the said mix to sheet form, and then applying aqueous color solutions to such of the said material while still in the wet state as is destined to form the outermost layer of the finished sheet after having been made up to the required thickness by lapped rolling in a known manner.

3. The method of coloring asbestos-cement sheeted composition material which consists in coloring homogeneously a mix of asbestos and cement, reducing the said mix to sheet form, and then spraying aqueous color solutions on to the said material while still in the wet condition and prior to making the same up to the required thickness of sheet by lapped rolling in a known manner.

KAREL ŠTICHA.